US012574290B2

(12) United States Patent
Cheng et al.

(10) Patent No.: US 12,574,290 B2
(45) Date of Patent: Mar. 10, 2026

(54) METHODS AND SYSTEMS FOR SCALING NODE CLUSTERS

(71) Applicant: eBay Inc., San Jose, CA (US)

(72) Inventors: Dongbin Cheng, Shanghai (CN); Lili Liu, Shanghai (CN); Yong Jiao, Shanghai (CN)

(73) Assignee: EBAY INC., San Jose, CA (US)

( * ) Notice: Subject to any disclaimer, the term of this patent is extended or adjusted under 35 U.S.C. 154(b) by 47 days.

(21) Appl. No.: 18/785,649

(22) Filed: Jul. 26, 2024

(65) Prior Publication Data

US 2026/0032049 A1 Jan. 29, 2026

(51) Int. Cl.
*H04L 41/0893* (2022.01)
*H04L 41/0806* (2022.01)

(52) U.S. Cl.
CPC ...... *H04L 41/0893* (2013.01); *H04L 41/0806* (2013.01)

(58) Field of Classification Search
None
See application file for complete search history.

(56) References Cited

U.S. PATENT DOCUMENTS

| | | | |
|---|---|---|---|
| 8,230,253 B2 | 7/2012 | Butterworth | |
| 10,733,201 B1 | 8/2020 | Chen et al. | |
| 2016/0150059 A1* | 5/2016 | Meng | H04L 67/51 |
| | | | 709/223 |
| 2020/0133793 A1* | 4/2020 | Greenwood | G06F 11/2094 |
| 2024/0134879 A1* | 4/2024 | Novak | G06F 16/27 |
| 2024/0354313 A1* | 10/2024 | Mankad | G06F 11/2097 |
| 2025/0103373 A1* | 3/2025 | Reddy | G06F 9/4555 |

FOREIGN PATENT DOCUMENTS

| | | |
|---|---|---|
| CN | 111478953 | 7/2020 |
| CN | 108600328 | 6/2021 |
| CN | 114844891 | 8/2022 |
| CN | 115225639 | 10/2022 |
| CN | 116319813 | 6/2023 |

OTHER PUBLICATIONS

"Dynamic Membership Async Raft", [Online]. Retrieved from the Internet https async-raft.github.io async-raftdynamic-membership. html, Jul. 2024, 1 pg.
Valekardas, Dimitrios, "Adaptation Through Replica Group Reconfiguration in NoSQL Data Stores", University of Ioannina, Dec. 2018, 81 pgs.

* cited by examiner

*Primary Examiner* — Joshua Joo
(74) *Attorney, Agent, or Firm* — SCHWEGMAN LUNDBERG & WOESSNER, P.A.

(57) ABSTRACT

A first cluster of nodes is deployed in at least one data center, the first cluster of nodes comprising: a leader node in communication with a client device and at least one follower node in communication with the leader node. One or more additional nodes are established and configured as a set of learner nodes associated with the first cluster of nodes. A predetermined number of learner nodes from the set of learner nodes are configured as a predetermined number of follower nodes in a second cluster of nodes. The leader node and the at least one follower node are transitioned from the first cluster of nodes to the second cluster of nodes. At least one learner node from the set of learner nodes is configured as a follower node in the second cluster of nodes.

20 Claims, 14 Drawing Sheets

302

502

A 5-node Raft cluster with
two learner members
Quorum size = 2
Tolerate 1 voter node down at most

METHODS AND SYSTEMS FOR SCALING NODE CLUSTERS

TECHNICAL FIELD

Embodiments of the present disclosure relate generally to scaling a cluster of nodes, and, more particularly, but not by way of limitation, to methods and systems for scaling a cluster of compute nodes (also referred to herein simply as "nodes").

BACKGROUND

In the digital era, distributed systems are essential for supporting modern applications, and providing resilient, high-performance, and scalable solutions by distributing computing and storage tasks across multiple nodes. As applications grow in complexity and user demands increase, the distributed systems are required to maintain strong consistency for data accuracy in various environments, while also ensuring high availability to manage surges in user activity during peak periods.

Usually, the distributed system has a demand to be scaled up (e.g., expand in terms of the number of nodes or number of distributed data centers) to meet capacity and performance needs. Conventional scaling methods, which often involve taking the entire system offline, can lead to significant business disruptions during the transition, greatly decreasing availability and causing inconvenience.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of examples, and not limitations, in the accompanying figures.

DETAILED DESCRIPTION

Figure 1:
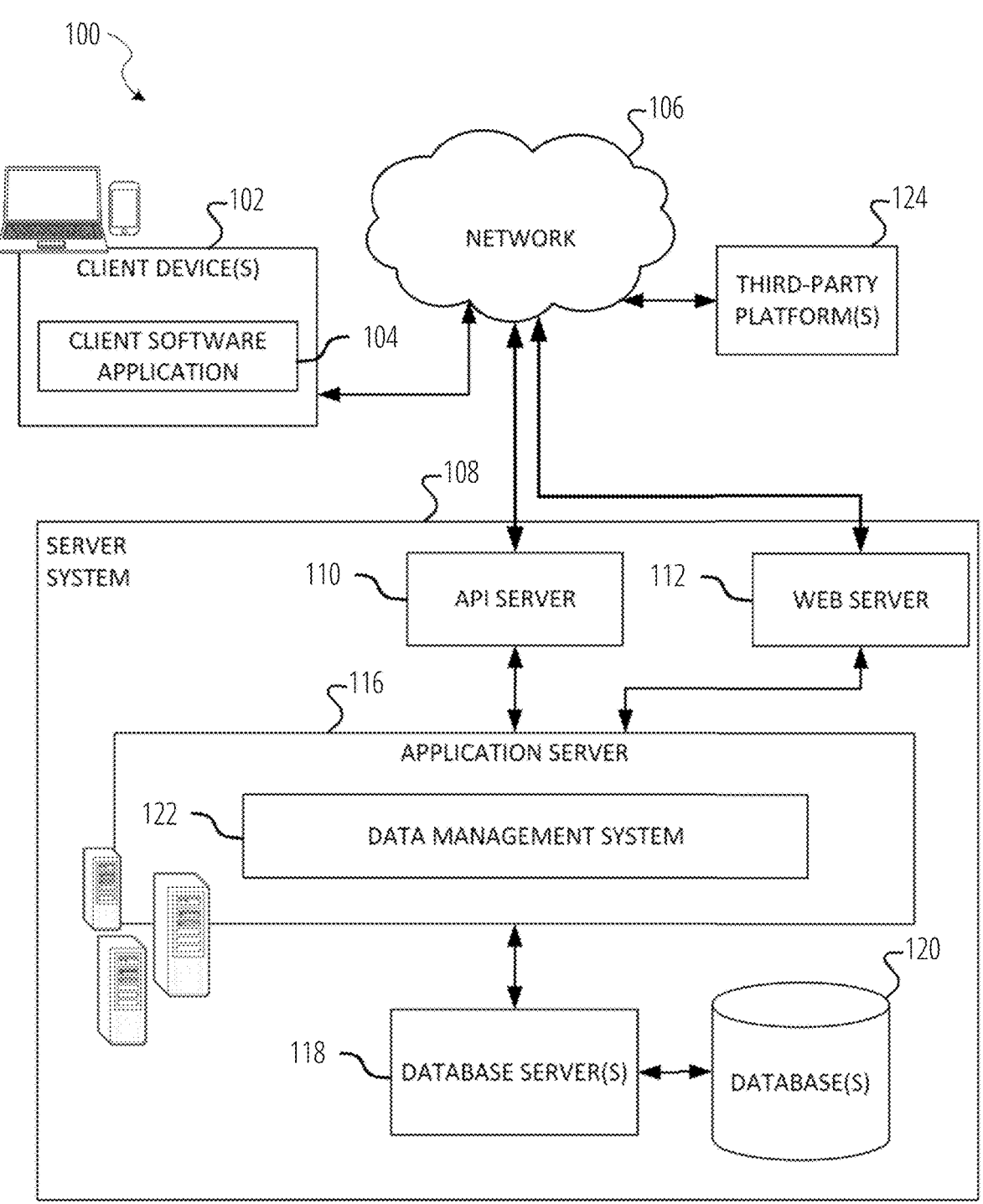
FIG. 1 is a block diagram showing an example data system, according to various embodiments of the present disclosure.

The description that follows includes systems, methods, techniques, instruction sequences, and computing machine program products that embody illustrative embodiments of the present disclosure. In the following description, for purposes of explanation, numerous specific details are set forth in order to provide a thorough understanding of embodiments. It will be evident, however, to one skilled in the art that the present inventive subject matter may be practiced without these specific details.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various embodiments may be given throughout this description. These are merely descriptions of specific embodiments. The scope or meaning of the claims is not limited to the embodiments given.

Various embodiments include systems, methods, and non-transitory computer-readable media that scale up a cluster of nodes while maintaining high availability and a low split-brain risk. The present disclosure provides a robust framework for expanding the capacity and resilience of distributed data systems, particularly those that require continuous operation and high data integrity. The scaling process is designed to integrate additional nodes into an existing cluster without disrupting ongoing operations or compromising the system's stability.

The initial setup involves deploying a first cluster of nodes, typically comprising a leader node and several follower nodes, across multiple distributed data centers. This configuration, often referred to as the initial cluster, can manage and distribute transaction data effectively. The leader node is responsible for the initial receipt and processing of transaction data, which may include financial transactions, log entries, or other data types relevant to the system's operations. The data is then replicated across follower nodes to ensure data integrity and fault tolerance, enhancing the overall reliability of the system. It should be noted that although the present disclosure is illustrated using transaction data of a financial accounting system as an example, it can be used for data occurring in other types of key-value storage systems, such as social platform databases, cloud computing environments, or package tracking systems. Such variations are all within the protection scope of the present disclosure.

As the need for greater processing power and data redundancy increases, the system adds additional nodes to expand the cluster from its initial configuration to a larger, target cluster. These additional nodes are initially configured as learner nodes which do not participate in the leader elections. Instead, they receive logs and synchronization data with other nodes without influencing the cluster's majority or quorum size.

The transition of learner nodes to fully functional follower nodes within the target cluster is meticulously managed to ensure each node is fully prepared (synchronized) to take on its new role without disrupting the existing state of the cluster. By carefully controlling the number of intermediate voting members at any stage of the scaling, a split-brain scenario where two or more subsets of cluster operate independently can be avoided.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes a data management system 122 (also referred to as system 122), according to various embodiments of the present disclosure. As shown, the data system 100 includes one or more client devices 102, a server system 108, and a network 106 (e.g., Internet, wide-area-network (WAN), local-area-network (LAN), wireless network) that communicatively couples them together. Each client device 102 can host a number of applications, including a client software application 104. The client software application 104 can communicate data with the server system 108 via a network 106. Accordingly, the client software application 104 can communicate and exchange data with the server system 108 via network 106.

The server system 108 provides server-side functionality via the network 106 to the client software application 104. While certain functions of the data system 100 are described herein as being performed by the data management system 122 on the server system 108, it will be appreciated that the location of certain functionality within the server system 108 is a design choice. For example, it may be technically preferable to initially deploy certain technology and functionality within the server system 108, but to later migrate this technology and functionality to the client software application 104.

The server system 108 supports various services and operations that are provided to the client software application 104 by the data management system 122. Such operations include transmitting data from the data management system 122 to the client software application 104, receiving data from the client software application 104 at the data management system 122, and the data management system 122 processing data generated by the client software application 104. Data exchanges within the data system 100 may be invoked and controlled through operations of software component environments available via one or more endpoints, or functions available via one or more user interfaces of the client software application 104, which may include web-based user interfaces provided by the server system 108 for presentation at the client device 102.

With respect to the server system 108, an Application Program Interface (API) server 110 and a web server 112 is coupled to an application server 116, which hosts the data management system 122. The application server 116 is communicatively coupled to a database server 118, which facilitates access to a database 120 that stores data associated with the application server 116, including data that may be generated or used by the data management system 122.

The API server 110 receives and transmits data (e.g., API calls, commands, requests, responses, and authentication data) between the client device 102 and the application server 116. Specifically, the API server 110 provides a set of interfaces (e.g., routines and protocols) that can be called or queried by the client software application 104 in order to invoke the functionality of the application server 116. The API server 110 exposes various functions supported by the application server 116 including, without limitation, user registration; login functionality; data object operations (e.g., generating, storing, retrieving, encrypting, decrypting, transferring, access rights, licensing); and/or user communications.

The server system 108, or the data management system 122 may extract user data from one or more third-party platforms 124 (e.g., third-party social media platforms).

Through one or more web-based interfaces (e.g., web-based user interfaces), the web server 112 can support various functionality of the data management system 122 of the application server 116.

Figure 2:
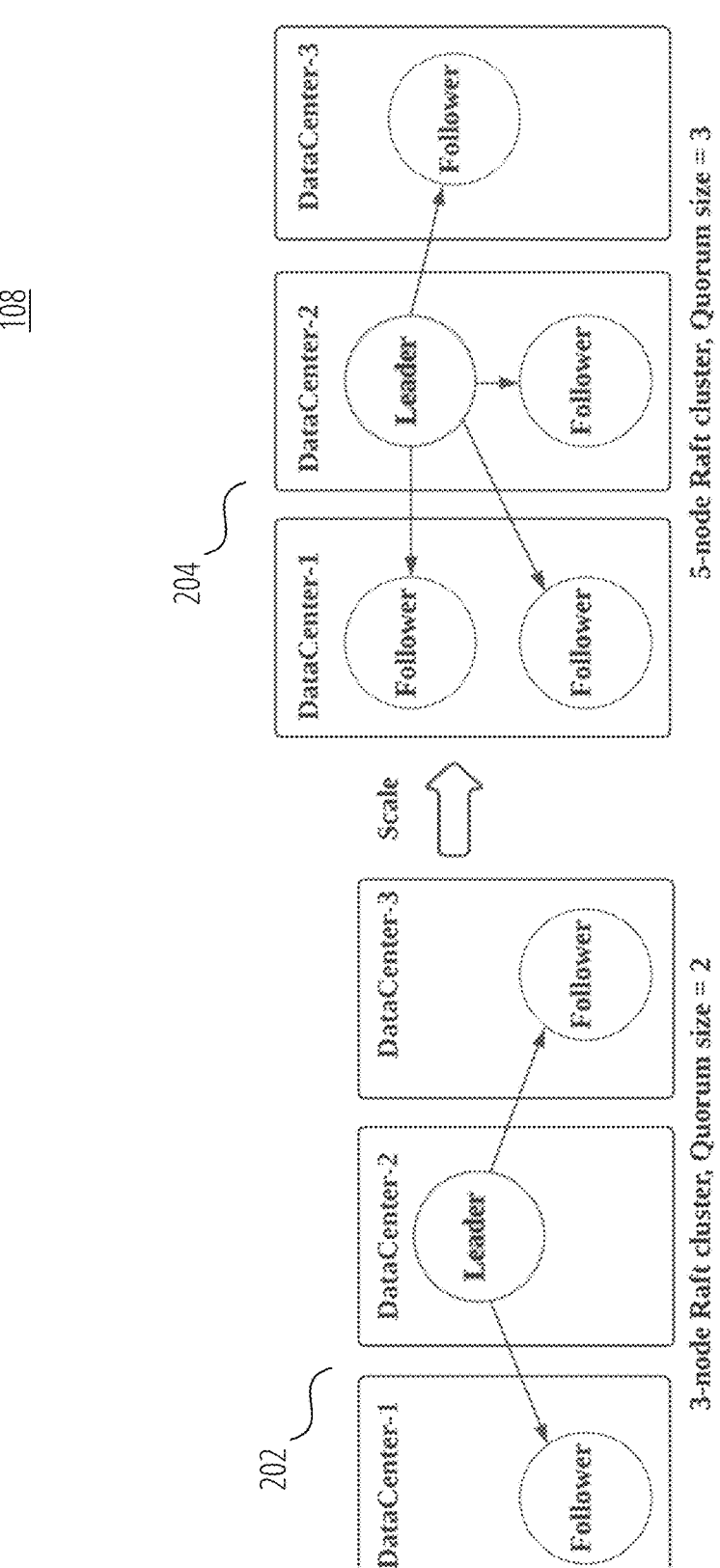
FIG. 2 is a schematic diagram illustrating the scaling of a cluster of nodes in a distributed data system, according to various embodiments of the present disclosure.

FIG. 2 is a schematic diagram illustrating the scaling of a cluster 202 of nodes in a distributed data system (e.g., server system 108), according to various embodiments of the present disclosure. As shown in FIG. 2, the initial cluster 202 (also referred to as a first cluster) may include one leader node and two follower nodes distributed in three data centers, DataCenter-1, DataCenter-2, and DataCenter-3, respectively. Such a configuration may be referred to as a 3-node Raft cluster. However, it should be noted that other types of clusters, including but not limited to those that use leader-follower nodes to ensure data replication and use quorum mechanisms to elect a leader, can also be used. Such variations are within the protection scope of the present disclosure.

In some embodiments, a client device (not shown in FIG. 2) may transmit data, such as transaction data, to the system 108. This transaction data is initially received by an elected leader node, which in this example is located in DataCenter-2. The leader node is responsible for distributing the transaction data across all nodes in the system 108.

It should be noted that the terms "transaction data," "log entries," "logs," and "journal entries" may be used interchangeably in the present disclosure based on the context. Transaction data refers to the raw data generated from various financial transactions, which could include details about sales, purchases, fund transfers, adjustments, and other financial activities. Each transaction typically includes information such as the date, amount, parties involved, and the nature of the transaction. Log entries generally refer to records in a system log that document changes or events within a system, e.g., the distributed data system 108. The log entries may include records of all the transactions and decisions made by the client device of the system 108. Logs are collections of log entries. Each node maintains a log, and the leader node is responsible for ensuring that all follower nodes have logs that replicate its log. This replication process involves appending new log entries to each node's log when transactions occur. Journal entries are the formal accounting entries that record financial transactions in the ledger. Each journal entry typically comprises a debit and a credit that must balance. The journal entries are derived from the transaction data and are used to update the accounts in the financial statements stored in the nodes.

Upon receiving the transaction data, the leader node performs preliminary validation and processing operations. It then replicates or forwards the transaction data to follower nodes within the same data center and across other data centers. This replication ensures that the transaction data is consistently maintained across the system 108, enhancing data integrity and fault tolerance.

Each follower node, upon receiving the replicated data, performs its own set of processing operations. These operations may include additional validations, calculations, or storage, depending on the specific role assigned to each node. For instance, one node might handle specific calculations related to the transaction, while another might focus on backup and recovery processes. In some embodiments, each of the nodes is assigned the same processing operations, such as updating the balances of accounts and recording transactions between them.

In the event of the leader node failure or at the initialization of the cluster 202, the nodes of the cluster 202 may initiate a leader election process. During the leader election process, each electable node of the cluster 202 can nominate itself or another node to become the new leader. A new leader may be chosen based on the majority vote from the electable nodes in the cluster 202. As used herein, "electable nodes" refer to nodes that are not learner nodes. Further details regarding learner nodes are discussed below. The majority vote of a cluster is referred to as a quorum of the cluster. For example, the quorum of a cluster of 3 electable nodes is 2. As another example, the quorum of a cluster of 4 electable nodes is 3. The quorum of a cluster of 5 electable nodes is 3. In some embodiments, a cluster can tolerate a failure of its nodes as long as the number of remaining working nodes exceeds the quorum. Comparing a cluster of 4 nodes with a cluster of 3 nodes, the number of tolerable failed nodes is not improved (remains 1) but the processing load and complexity are increased. Therefore, it may not be beneficial to have even numbers of nodes in a cluster. However, this is not intended to be restricting. A cluster of an even number of nodes is also within the protection scope of the present disclosure. Once a new leader node is elected, it takes over the responsibilities of the previous leader node, including the processing and replication of transaction data.

Referring back to FIG. 2, the 3-node initial cluster 202 may be scaled up to the 5-node target cluster 204 (also referred to as a second cluster) by adding two new nodes. In some example embodiments, the new nodes may be configured in the existing data centers (e.g., DataCenter-1 and DataCenter-2). Alternatively, the new nodes may be configured in at least one new data center (e.g., a DataCenter-4, not shown in FIG. 2). During scaling of the initial cluster 202, there may involve two steps: 1) transitioning the three existing nodes (also referred to as S1, S2, and S3) in the initial cluster 202 to the target cluster 204; and 2) adding two new nodes (also referred to as S4 and S5) to the target cluster 204.

Figure 3A:
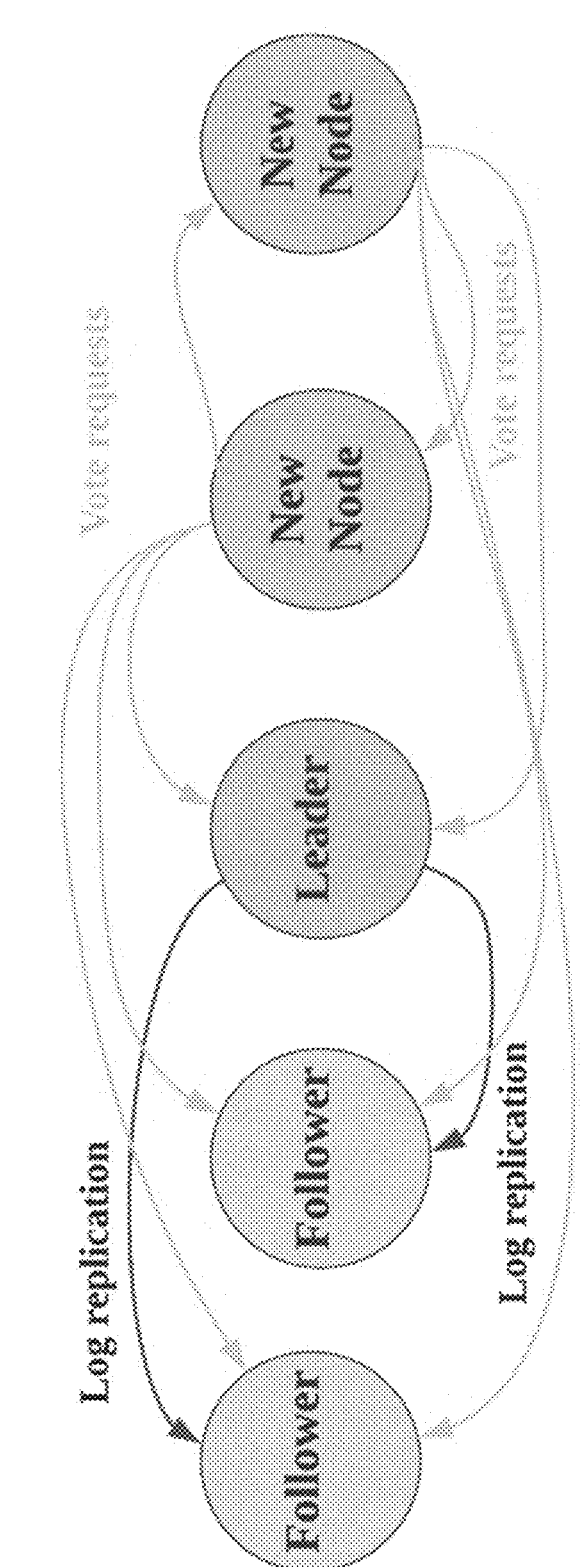
FIG. 3A is a diagram illustrating an example scenario of adding new nodes during cluster scaling, according to various embodiments of the present disclosure.

FIG. 3A is a diagram illustrating an example scenario 302 when adding new nodes during cluster scaling, according to various embodiments of the present disclosure. The example scenario 302 involves first adding two new nodes (S4 and S5) to the target 5-node cluster 204, followed by updating the configurations of the three existing nodes (S1, S2, and S3) from the initial cluster 202 to the target cluster 204.

As shown in FIG. 3A, once the new nodes S4 and S5 are added, the existing nodes S1, S2, and S3 are not immediately aware of the changes in the initial cluster 202 (e.g., the addition of follower nodes S4 and S5 and the scaling of the cluster 202). Consequently, the leader node of the original cluster 202 fails to replicate logs to the newly added nodes S4 and S5. These new nodes S4 and S5, due to failure to receive logs, may repeatedly send election requests to the existing nodes S1, S2, and S3 to initiate a new round of leader elections. During the leader election periods when the cluster 204 lacks a leader node, it becomes unavailable to receive or process transaction data from the client device.

Figure 3B:
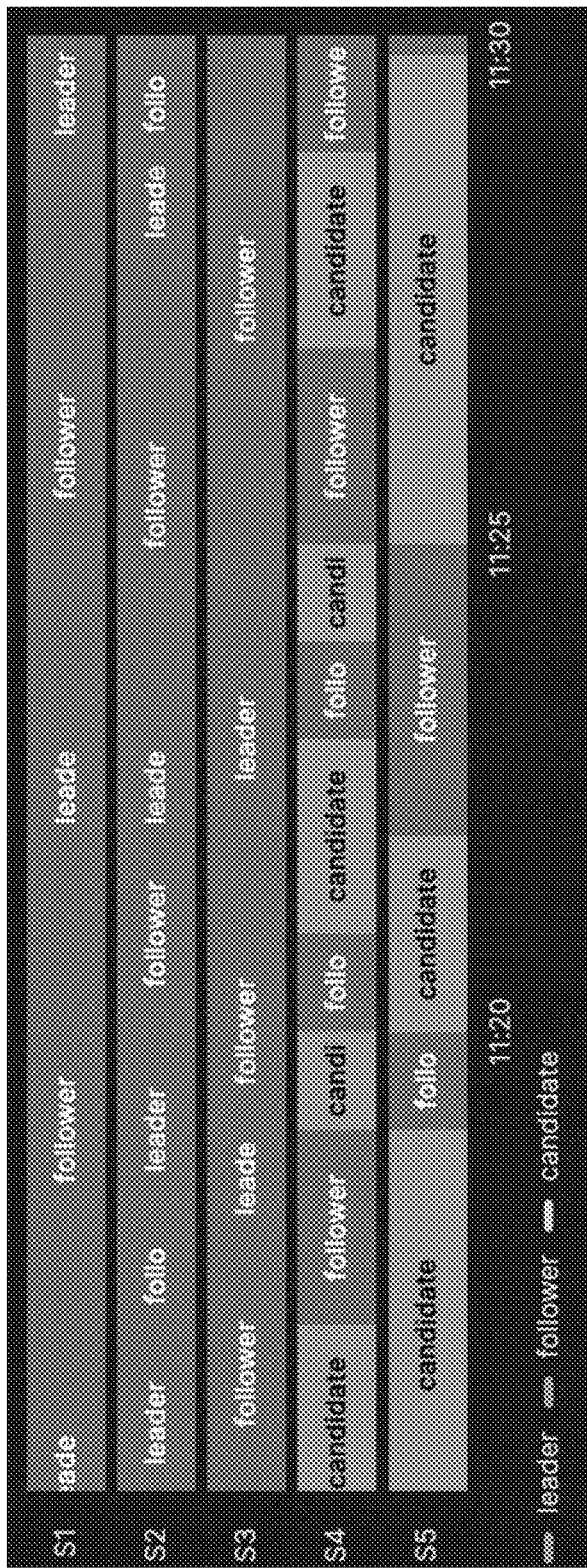
FIG. 3B is a diagram illustrating the status of the nodes during cluster scaling in the example scenario of FIG. 3A, according to various embodiments of the present disclosure.

FIG. 3B is a diagram illustrating the status 304 of the nodes during cluster scaling in the example scenario of FIG. 3A, according to various embodiments of the present disclosure. As shown in FIG. 3B, the new nodes S4 and S5 persistently initiate new rounds of leader election, causing the leadership of cluster 204 to repeatedly shift among nodes S1, S2, and S3. This frequent change in leadership renders the entire cluster 204 unstable and intermittently unavailable.

Figure 4A:
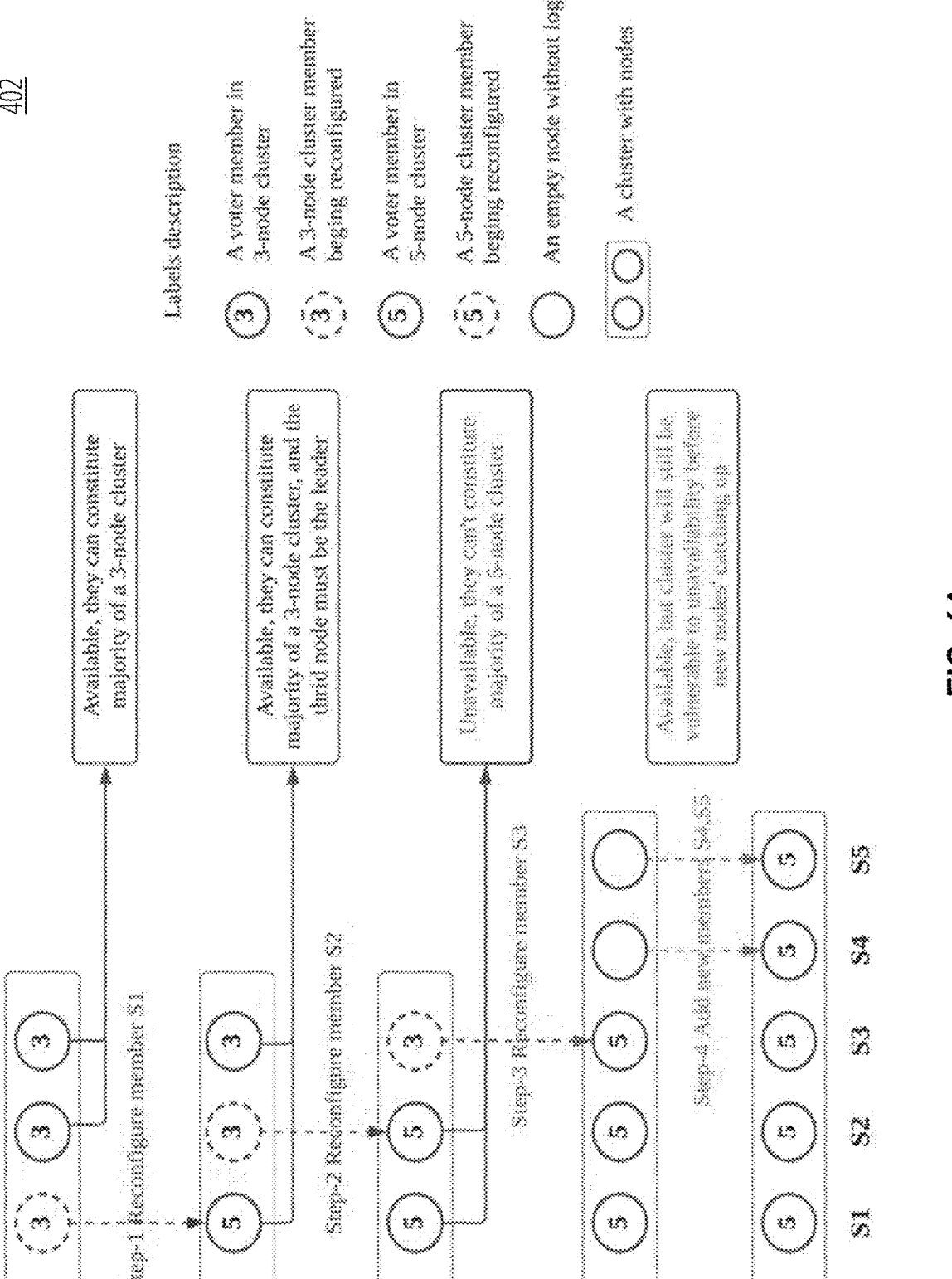
FIG. 4A is a diagram illustrating an example scenario of transitioning existing nodes during cluster scaling, according to various embodiments of the present disclosure.

FIG. 4A is a diagram illustrating an example scenario 402 of transitioning existing nodes during cluster scaling, according to various embodiments of the present disclosure. The example scenario 402 involves first updating the configurations of the three existing nodes (S1, S2, and S3) from the initial cluster 202 to the target cluster 204, followed by adding two new nodes (S4 and S5) to the target 5-node cluster 204.

During the reconfiguration process, each node needs to be restarted to load the new configuration. As shown in FIG. 4A, during the reconfiguration of node S3, the existing nodes S1 and S2 are already members of the 5-node target cluster 204. However, as mentioned above, the quorum of a 5-node target cluster 204 is three, which means that a leader cannot be elected in target cluster 204 (the target cluster 204 is unavailable) until the node S3 is reconfigured.

In addition, even after the cluster scaling is completed, this example scenario 402 still has a potential risk of being unavailable for a considerable period. Specifically, when the newly added nodes S4 and S5 join the cluster 204 without any existing logs, these nodes S4 and S5 require time to synchronize logs from the leader among S1-S3. While synchronizing up the logs, if any of the existing nodes (S1, S2, S3) experiences a failure, the cluster 204 will be unable to commit new logs and finish the establishment of the new nodes S4 and S5.

Figure 4B:
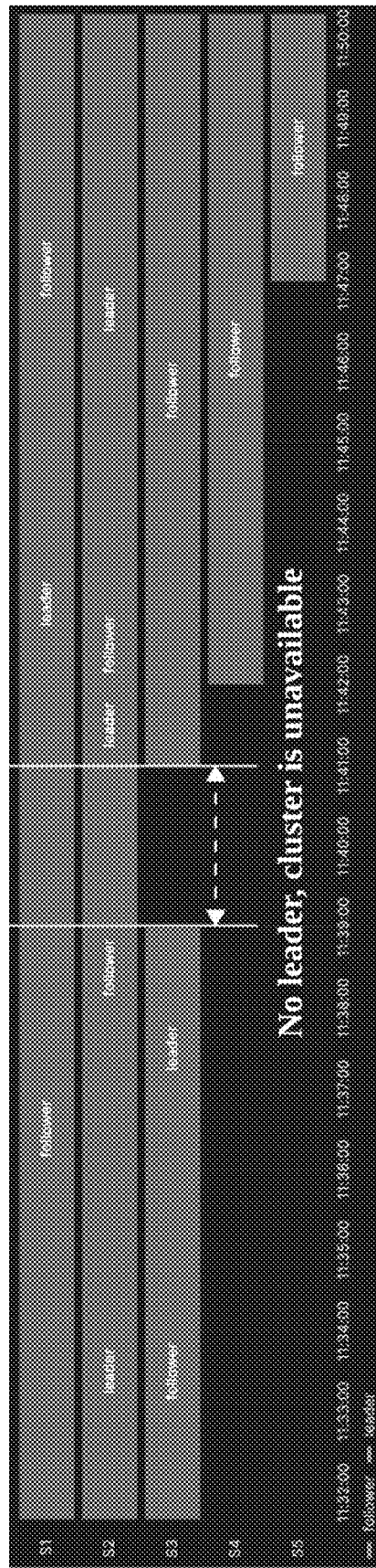
FIG. 4B is a diagram illustrating the status of the nodes during cluster scaling in the example scenario of FIG. 4A, according to various embodiments of the present disclosure.

FIG. 4B is a diagram illustrating the status 404 of the nodes during cluster scaling in the example scenario of FIG. 4A, according to various embodiments of the present disclosure. As shown in FIG. 4B, during the reconfiguration of node S3 from the initial cluster 202 to the target cluster 204, the whole cluster 204 is unavailable because S1 and S2 cannot constitute the quorum of the 5-node target cluster 204, e.g., a leader cannot be elected.

Figure 5:
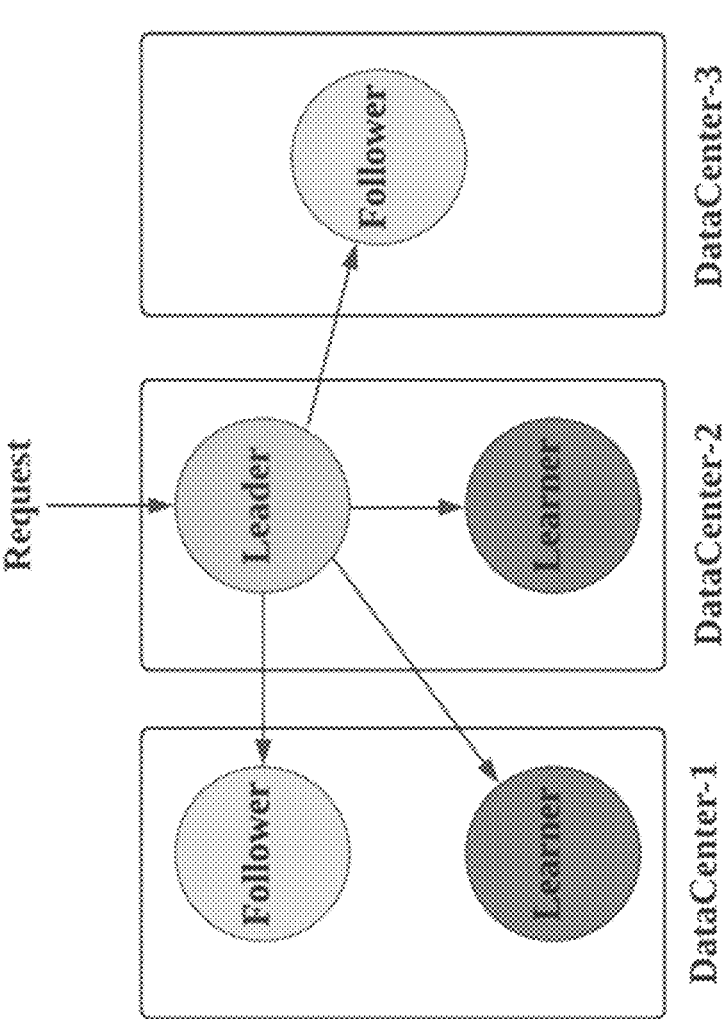
FIG. 5 is a diagram illustrating an example configuration of learner nodes during cluster scaling, according to various embodiments of the present disclosure.

FIG. 5 is a diagram illustrating an example configuration 502 of learner nodes during cluster scaling, according to various embodiments of the present disclosure. The strategic integration of learner nodes into the cluster enhances the cluster's scalability and stability without impacting its availability. Specifically, learner nodes in a cluster act as non-voting members. Their primary function is to receive logs from the leader without participating in leader elections or voting, thus not being counted towards the cluster's quorum and not repeatedly initiating leader elections. For example, the example configuration 502 includes adding the new nodes S4 and S5 as learner nodes. Since the learner nodes do not participate in leader election, the quorum of the example configuration 502 is 2, which means there is a tolerance of failure or reconfiguration of one node among the existing nodes S1-S3 without affecting the availability of the cluster 204.

Besides maintaining high availability, the inclusion of learner nodes may be beneficial in another aspect. For example, as new nodes S4 and S5 might need substantial time to catch up with the existing logs, integrating them as learners initially allows for this synchronization without risking the cluster's operational integrity. Once these new nodes have successfully synchronized their logs with the rest of the cluster, these new nodes S4 and S5 can be transitioned to full members. It should be noted that the terms "full members," "electable members," and "electable nodes" may be used interchangeably in the present disclosure to refer to either a leader node or a follower node, not a learner node.

Figure 6:
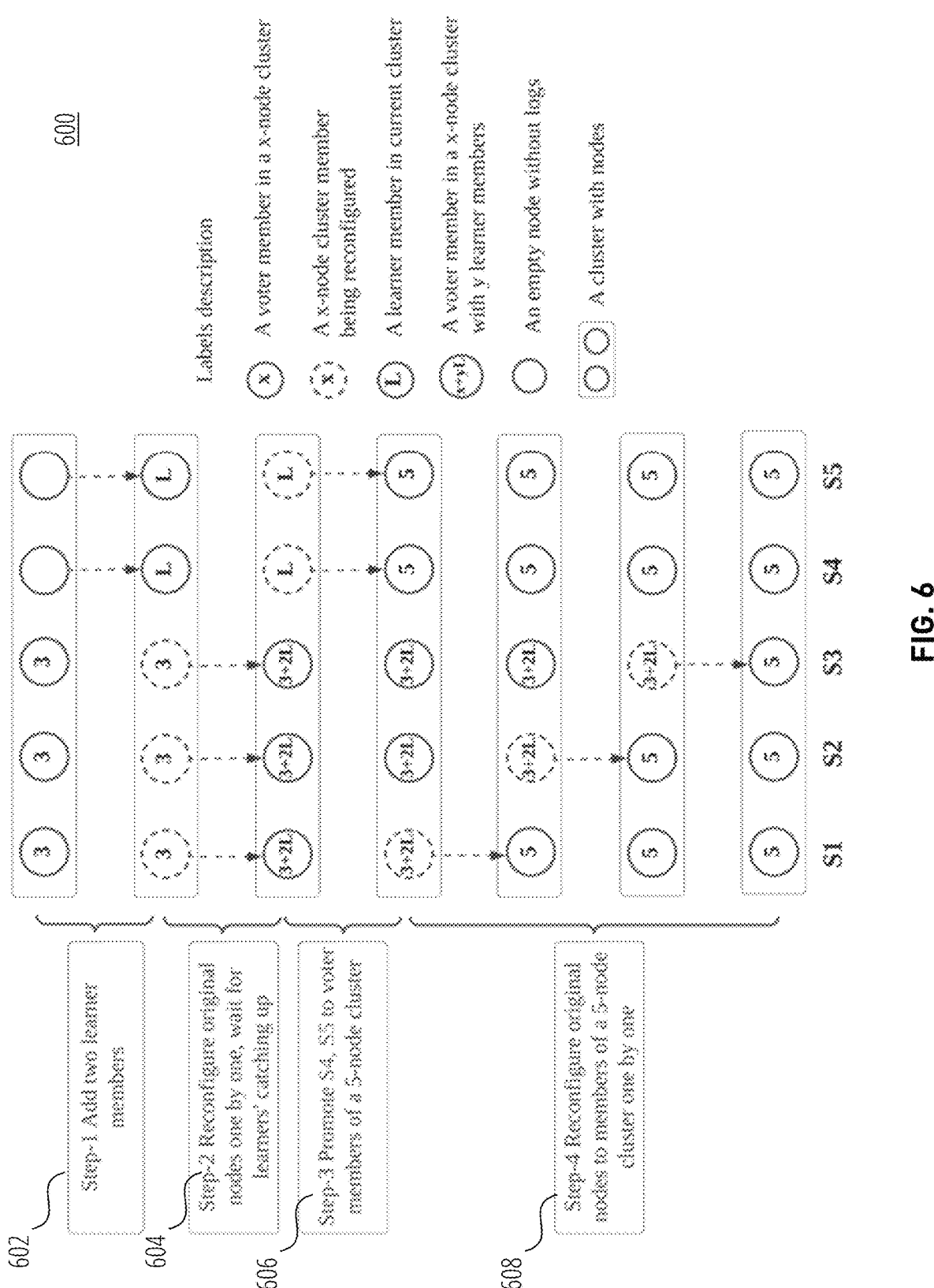
FIG. 6 is a diagram illustrating an example method for cluster scaling with the use of learner nodes, according to various embodiments of the present disclosure.

FIG. 6 is a diagram illustrating an example method 600 for cluster scaling with the use of learner nodes, according to various embodiments of the present disclosure. As shown in FIG. 6, the method 600 begins with step 602, e.g., the addition of two new nodes, S4 and S5, to the cluster. These nodes are introduced as learner nodes, which means they are configured to receive logs from the current leader but do not participate in the voting process or leader elections. This step 602 ensures that the addition of these nodes does not alter the existing quorum of the cluster, thereby maintaining the stability and availability of the system. The existing nodes (S1, S2, and S3) are made aware of the addition of the two learner nodes (labeled as "3+2L"). Once added and the existing nodes are aware of the learner nodes, the learner nodes S4 and S5 synchronize their logs with the current leader's logs in step 604. After the learner nodes have successfully caught up with the logs, they are transitioned in step 606 to follower nodes in the target 5-node cluster through a reconfiguration process (also referred to as transitioning process). The reconfiguration includes updating the cluster's metadata to reflect the new roles of S4 and S5 as followers. After the reconfiguration of the new nodes S4 and S5, the existing nodes S1-S3 are reconfigured to members of the target 5-node cluster one by one in step 608. Throughout the reconfiguration process, the number of active and available nodes always exceeds the quorum requirement, thereby maintaining high availability.

Figure 7:
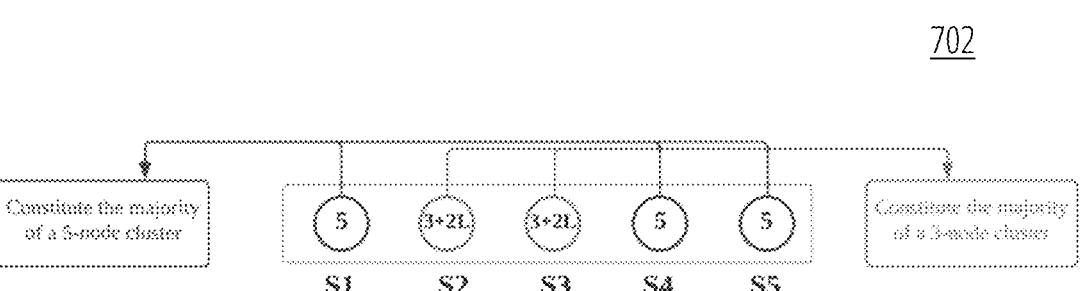
FIG. 7 is a diagram illustrating an example split-brain scenario during cluster scaling, according to various embodiments of the present disclosure.

FIG. 7 is a diagram illustrating an example split-brain scenario 702 during cluster scaling, according to various embodiments of the present disclosure. The example split-brain scenario 702 captures a moment where the cluster's configuration inadvertently supports the existence of two separate majorities, potentially leading to conflicting states within the cluster.

Specifically, the initial configuration of the cluster includes three nodes (S1, S2, S3), and the intent is to scale up by adding two additional nodes (S4, S5). During the scaling process, as exemplified in FIG. 6, nodes undergo a series of reconfigurations to integrate the new nodes into the cluster, comprising updating the cluster's metadata, adjusting roles, and synchronizing logs to ensure all nodes are consistent with the latest cluster.

However, a particular point arises during the transition when S1 has been successfully reconfigured to operate within a five-node cluster, together with S4 and S5. Simultaneously, S2 and S3, still operating under the old configuration, recognize themselves as the majority for the original three-node cluster. This configuration allows for the possibility of each group (S1, S4, S5 and S2, S3) independently electing their own leader, leading to a split-brain scenario. In a split-brain scenario, two leaders may operate under the belief that they are in control, leading the cluster to enter a state where conflicting decisions are made. This effect can result in data inconsistencies, as each partition may accept and process data independently, without awareness of the other's actions.

To mitigate such scenarios and prevent the severe impacts they can have on the integrity of the system, it is important to manage the reconfiguration steps meticulously, ensuring that at no point during the transition can a subset of nodes independently form a quorum. This might involve temporarily disabling certain nodes from participating in elections or delaying the reconfiguration of some of the learner node.

Figure 8:
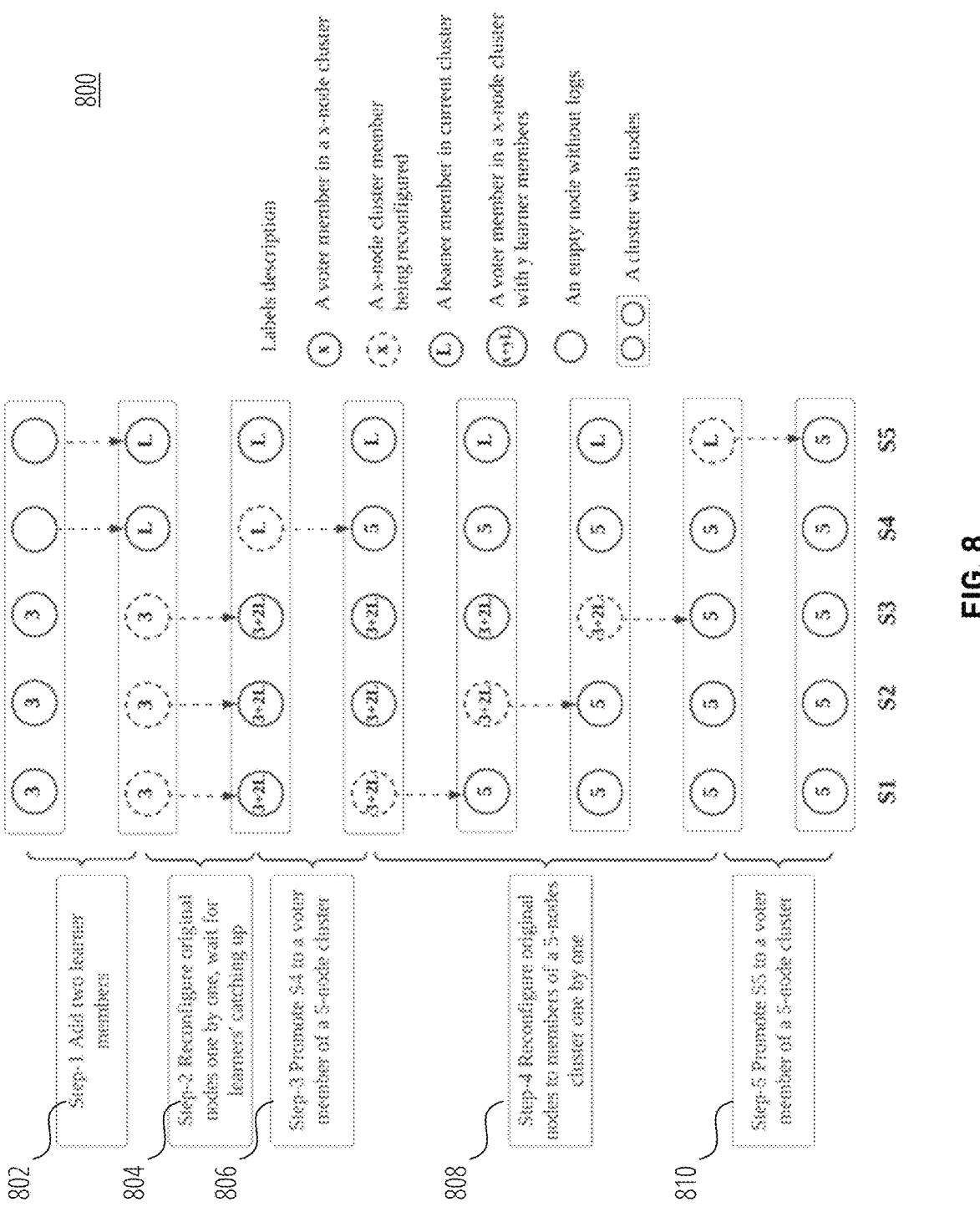
FIG. 8 is a diagram illustrating an updated method for cluster scaling with the use of learner nodes, according to various embodiments of the present disclosure.

FIG. 8 is a diagram illustrating an updated method 800 for cluster scaling with the use of learner nodes, according to various embodiments of the present disclosure. Method 800 recites a refined approach tailored to mitigate and prevent the risks associated with split-brain scenario 702 that can emerge during the scaling process.

Similar to the initial step 602 of method 600, the updated scaling method 800 begins by adding two new nodes to the cluster in step 802, designated as learners. The new nodes are initially added with a non-voting capacity to allow them to synchronize with the cluster without impacting the existing quorum in step 804.

Rather than promoting both learner nodes to followers in the target 5-node cluster simultaneously, only one of the learner nodes is transitioned to the follower in step 806. As shown in FIG. 8, at each moment, one but not both of initial 3-node cluster and the target 5-node cluster has quorum. This maintains the integrity of the cluster and prevent the simultaneous existence of two quorums, which could lead to conflicting leadership and the split-brain scenario. After the reconfiguration of the new nodes S4, the existing nodes S1-S3 are reconfigured to members of the target 5-node cluster one by one in step 808. Finally, the remaining learner node S5 is reconfigured to a follower node in the target 5-node cluster in step 810.

Figure 9:
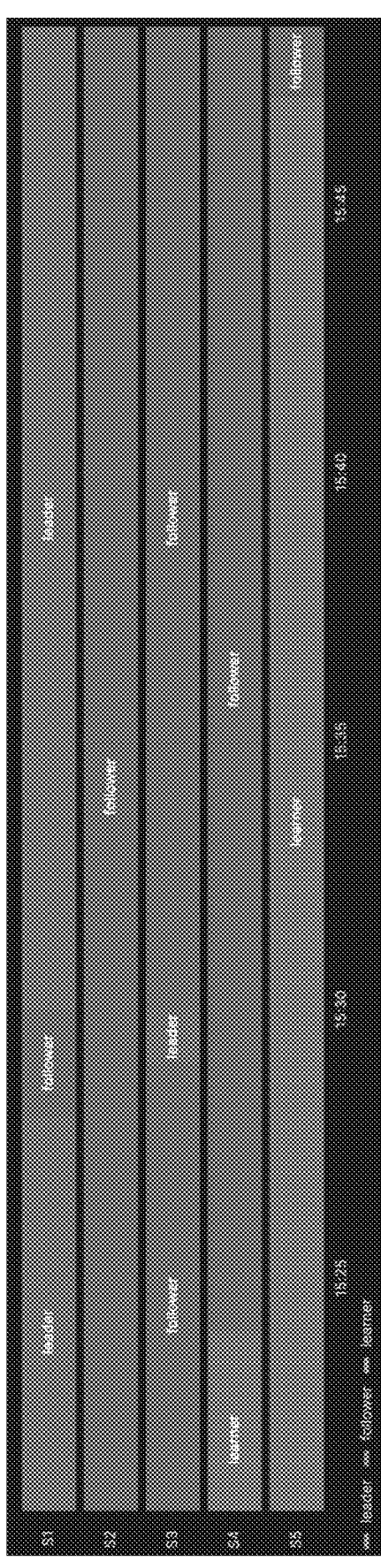
FIG. 9 is a diagram illustrating the status of the nodes during cluster scaling using the updated method of FIG. 8, according to various embodiments of the present disclosure.

FIG. 9 is a diagram illustrating the status 902 of the nodes during cluster scaling using the updated method of FIG. 8, according to various embodiments of the present disclosure. FIG. 9 provides a detailed view of the operational state of each node within the cluster as they undergo the process of scaling, highlighting the sequential and controlled transition of new nodes into follower roles. As shown in FIG. 9, the new nodes, S4 and S5, are transitioned to the follower nodes sequentially rather than simultaneously such that the cluster continues to operate under a stable leadership, with the existing nodes maintaining their roles until the new nodes are fully integrated. The leader node continues to synchronize logs with both new and existing nodes, ensuring that all members of the cluster are updated consistently.

Figure 10:
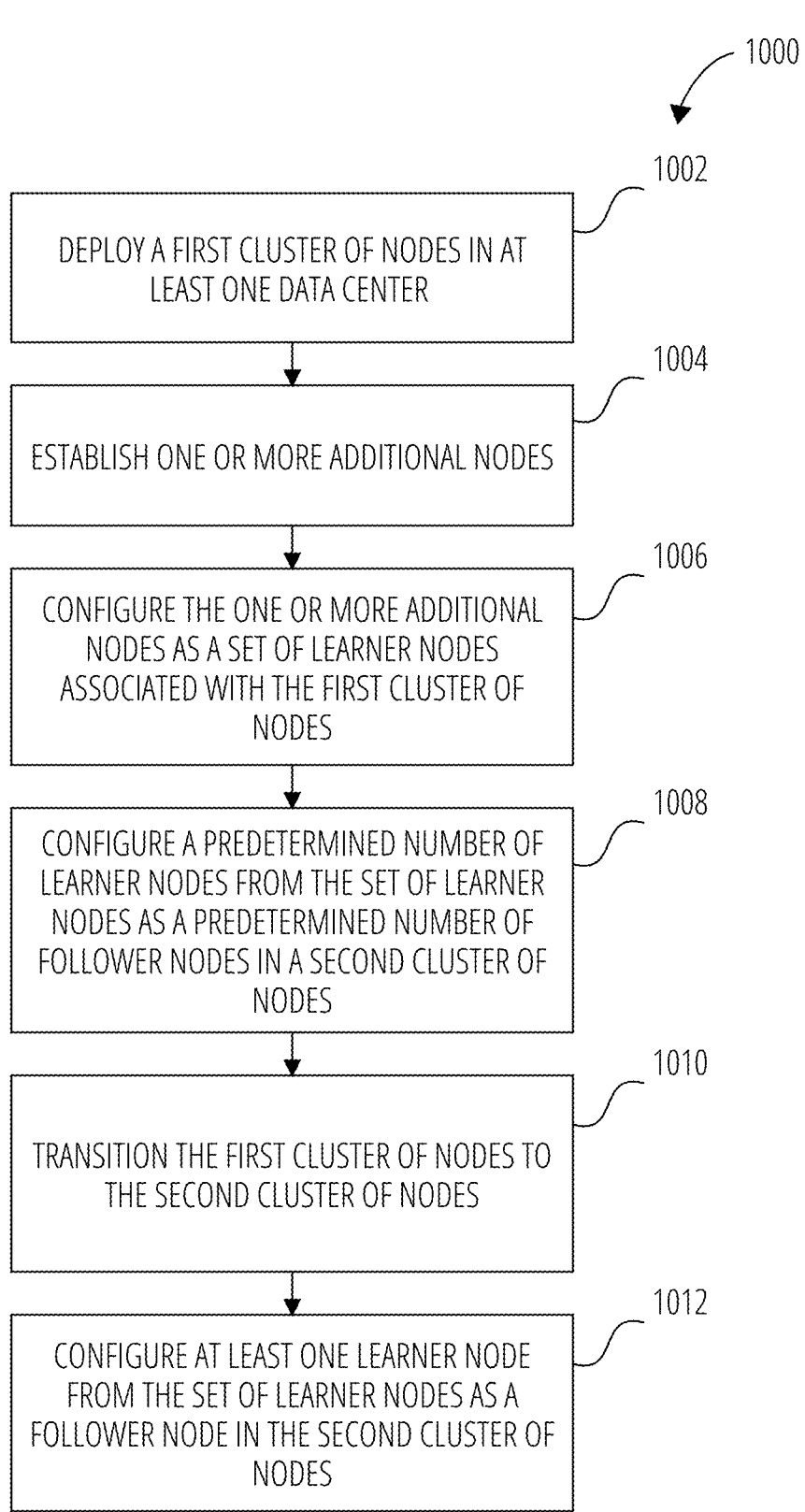
FIG. 10 is a flowchart illustrating an example method for scaling a cluster of nodes, according to various embodiments of the present disclosure.

FIG. 10 is a flowchart illustrating an example method 1000 for scaling a cluster of nodes, according to various embodiments of the present disclosure. It will be understood that example methods described herein may be performed by a machine in accordance with some embodiments. For example, method 1000 can be performed by the data management system 122, the server system 108, the database 120, or individual components thereof. An operation of method 1000 may be performed by one or more hardware processors (e.g., central processing units or graphics processing units) of a computing device (e.g., a desktop, server, laptop, mobile phone, tablet, etc.), which may be part of a computing system based on a cloud architecture. The method 1000 may also be implemented in the form of executable instructions stored on a machine-readable medium or in the form of electronic circuitry. For instance, the operations of method 1000 may be represented by executable instructions that, when executed by a processor of a computing device, cause the computing device to perform method 1000. Depending on the embodiment, an operation of the method 1000 may be repeated in different ways or involve intervening operations not shown. Though the operations of the method 1000 may be depicted and described in a certain order, the order in which the operations are performed may vary among embodiments, including performing certain operations in parallel.

At operation 1002, the server system 108 deploys a first cluster of nodes (also referred to as initial cluster of nodes, $C_A$) in at least one data center. In some example embodiments, the first cluster $C_A$ has A nodes and quorum size m of first cluster $C_A$ can be expressed as:

$$m = \lfloor A/2 \rfloor + 1 \tag{1},$$

where $\lfloor \ \rfloor$ denotes a rounding-down operator.

At operation 1004, the server system 108 establishes one or more additional nodes. The goal of method 1000 is to expand the first cluster $C_A$ to a second cluster (also referred to as target cluster, $C_B$) with B nodes. The quorum size n of the second cluster $C_B$ can similarly be expressed as:

$$n = \lfloor B/2 \rfloor + 1 \tag{2}$$

The number of the one or more nodes corresponds to the difference between a second cluster and the first cluster (e.g., B–A).

At operation 1006, the server system 108 configures the one or more additional nodes as a set of learner nodes associated with the first cluster of nodes.

At operation 1008, the server system 108 configures a predetermined number of learner nodes from the set of learner nodes as a predetermined number of follower nodes in a second cluster of nodes. In some example embodiments, an intermediate voting member size, denoted as X, should satisfy the following inequality to prevent split-brain and to maintain availability at the same time:

$$\max(m,n) < X \le (m+n) \tag{3}$$

The purpose of the left part of inequality (3) is to ensure a seamless scaling (high availability) without downtime. Within the step-by-step reconfiguration illustrated in the updated method 800, the smallest possible voting member size is X–1. If X–1 is greater than or equal to the maximum quorum size of the initial cluster/target cluster (max (m,n)), at least one of the clusters $C_A$ and $C_B$ can satisfy the quorum, enabling normal log replication and leader election. Since n>m and X is a natural number, the inequality (3) may be simplified as:

$$n < X \le (m+n) \tag{4}$$

The right part, X<(m+n), prevents split-brain scenarios. For example, when the voting member size X is less than the combined majority of both clusters (m+n), it becomes impossible to elect two leaders because a member can only vote for a single node at a time. In some example embodiments, to ensure higher tolerance against node failures, X is at an upper limit of the inequality (4), e.g., X=m+n–1. The predetermined number of learner nodes can be expressed as X–A.

For example, an initial cluster of 3 nodes are scaled to a target cluster of 5 nodes. Based on equations (1) and (2), m=2 and n=3. Based on inequality (4), X is greater than 3 but less than 5. Therefore, X is 4 and the predetermined number of learner nodes configured as the follower nodes is 1, which matches with the updated method 800.

As another example, an initial cluster of 4 nodes are scaled to a target cluster of 7 nodes. Based on equations (1) and (2), m=3 and n=4. Based on inequality (4), X is greater than 4 but less than 7. In this case, X can be 5 or 6 and the predetermined number of learner nodes that are configured as the follower nodes is either 1 or 2. Both ways maintain a high availability and prevent split-brain scenarios while configuring 2 learner nodes as follower nodes can give a higher tolerance.

At operation 1010, the server system 108 transitions the first cluster of nodes to the second cluster of nodes. In some example embodiments, the follower nodes are transitioned to the second cluster before the leader node to minimize leader elections. In some example embodiments, the leader node and the at least one follower node are transitioned one at a time.

At operation 1012, the server system 108 configures at least one learner node (e.g., the remaining learner nodes (B–X)) from the set of learner nodes as a follower node in the second cluster of nodes.

Figure 11:
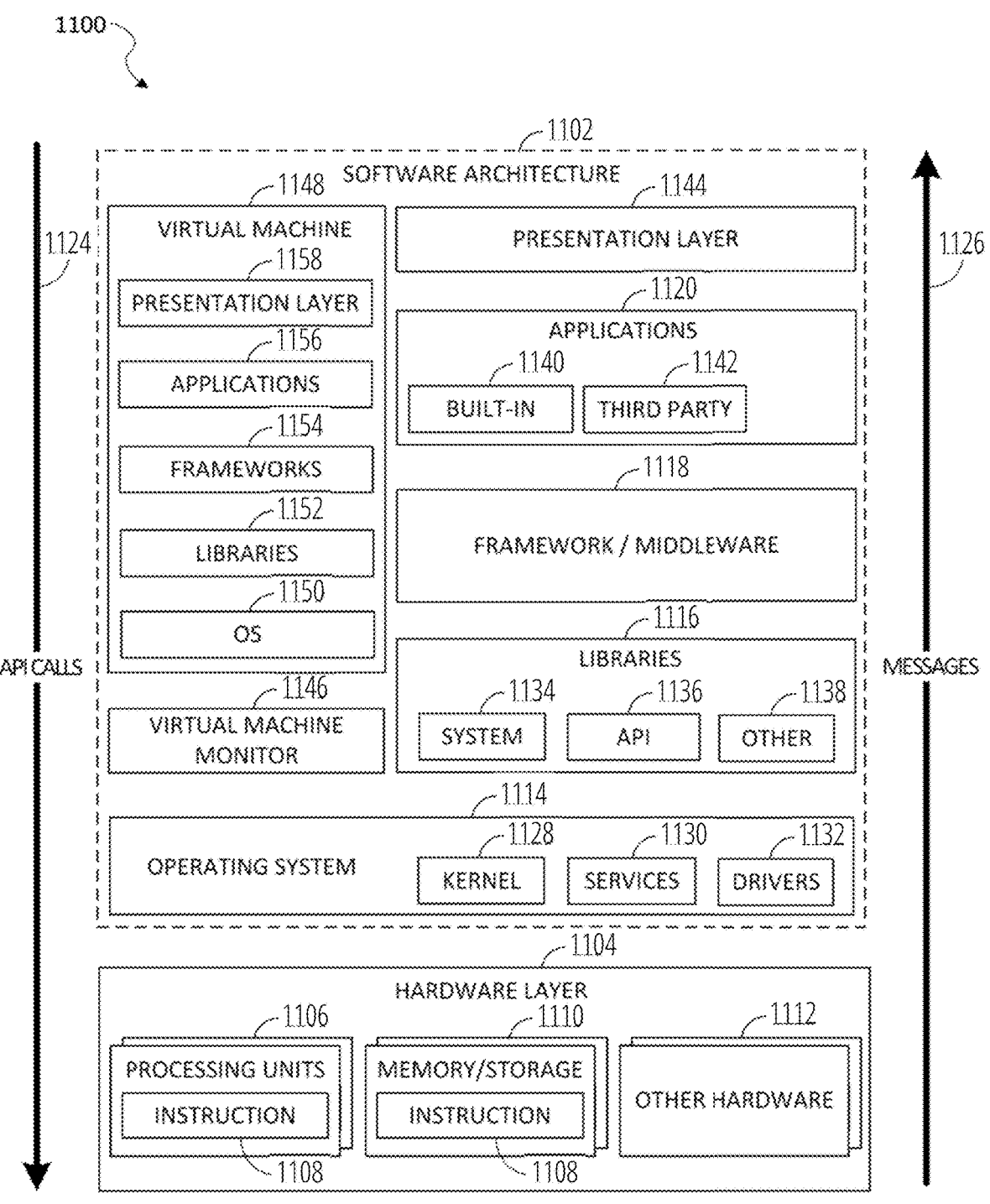
FIG. 11 is a block diagram illustrating a representative software architecture, which may be used in conjunction with various hardware architectures herein described, according to various embodiments of the present disclosure.

FIG. 11 is a block diagram illustrating an example of a software architecture 1102 that may be installed on a machine, according to some example embodiments. FIG. 11 is merely a non-limiting example of a software architecture, and it will be appreciated that many other architectures may be implemented to facilitate the functionality described herein. The software architecture 1102 may be executing on hardware such as a machine 1200 of FIG. 12 that includes, among other things, processors 1210, memory 1230, and input/output (I/O) components 1250. A representative hardware layer 1104 is illustrated and can represent, for example, the machine 1200 of FIG. 12. The representative hardware layer 1104 comprises one or more processing units 1106 having associated executable instructions 1108. The executable instructions 1108 represent the executable instructions of the software architecture 1102. The hardware layer 1104 also includes memory or storage modules 1110, which also have the executable instructions 1108. The hardware layer 1104 may also comprise other hardware 1112, which represents any other hardware of the hardware layer 1104, such as the other hardware illustrated as part of the machine 1200.

In the example architecture of FIG. 11, the software architecture 1102 may be conceptualized as a stack of layers, where each layer provides particular functionality. For example, the software architecture 1102 may include layers such as an operating system 1114, libraries 1116, frameworks/middleware 1118, applications 1120, and a presentation layer 1144. Operationally, the applications 1120 or other components within the layers may invoke API calls 1124 through the software stack and receive a response, returned values, and so forth (illustrated as messages 1126) in response to the API calls 1124. The layers illustrated are representative in nature, and not all software architectures have all layers. For example, some mobile or special-purpose operating systems may not provide a frameworks/middleware 1118 layer, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than by interfacing directly with the underlying operating system 1114 functionality (e.g., kernel 1128, services 1130, or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 or other software components/modules. For example, the frameworks 1118 may provide various graphical user interface functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a home application, a contacts application, a browser application, a book reader application, a location application, a media application, a messaging application, or a game application.

The third-party applications 1142 may include any of the built-in applications 1140, as well as a broad assortment of other applications. In a specific example, the third-party applications 1142 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 1142 may invoke the API calls 1124 provided by the mobile operating system such as the operating system 1114 to facilitate functionality described herein.

The applications 1120 may utilize built-in operating system functions (e.g., kernel 1128, services 1130, or drivers 1132), libraries (e.g., system libraries 1134, API libraries 1136, and other libraries 1138), or frameworks/middleware 1118 to create user interfaces to interact with users of the system. Alternatively, or additionally, in some systems, interactions with a user may occur through a presentation layer, such as the presentation layer 1144. In these systems, the application/module "logic" can be separated from the aspects of the application/module that interact with the user.

Some software architectures utilize virtual machines. In the example of FIG. 11, this is illustrated by a virtual machine 1148. The virtual machine 1148 creates a software environment where applications/modules can execute as if they were executing on a hardware machine. The virtual machine 1148 is hosted by a host operating system (e.g., the operating system 1114) and typically, although not always, has a virtual machine monitor 1146, which manages the operation of the virtual machine 1148 as well as the interface with the host operating system (e.g., the operating system 1114). A software architecture executes within the virtual machine 1148, such as an operating system 1150, libraries 1152, frameworks 1154, applications 1156, or a presentation layer 1158. These layers of software architecture executing within the virtual machine 1148 can be the same as corresponding layers previously described or may be different.

Figure 12:
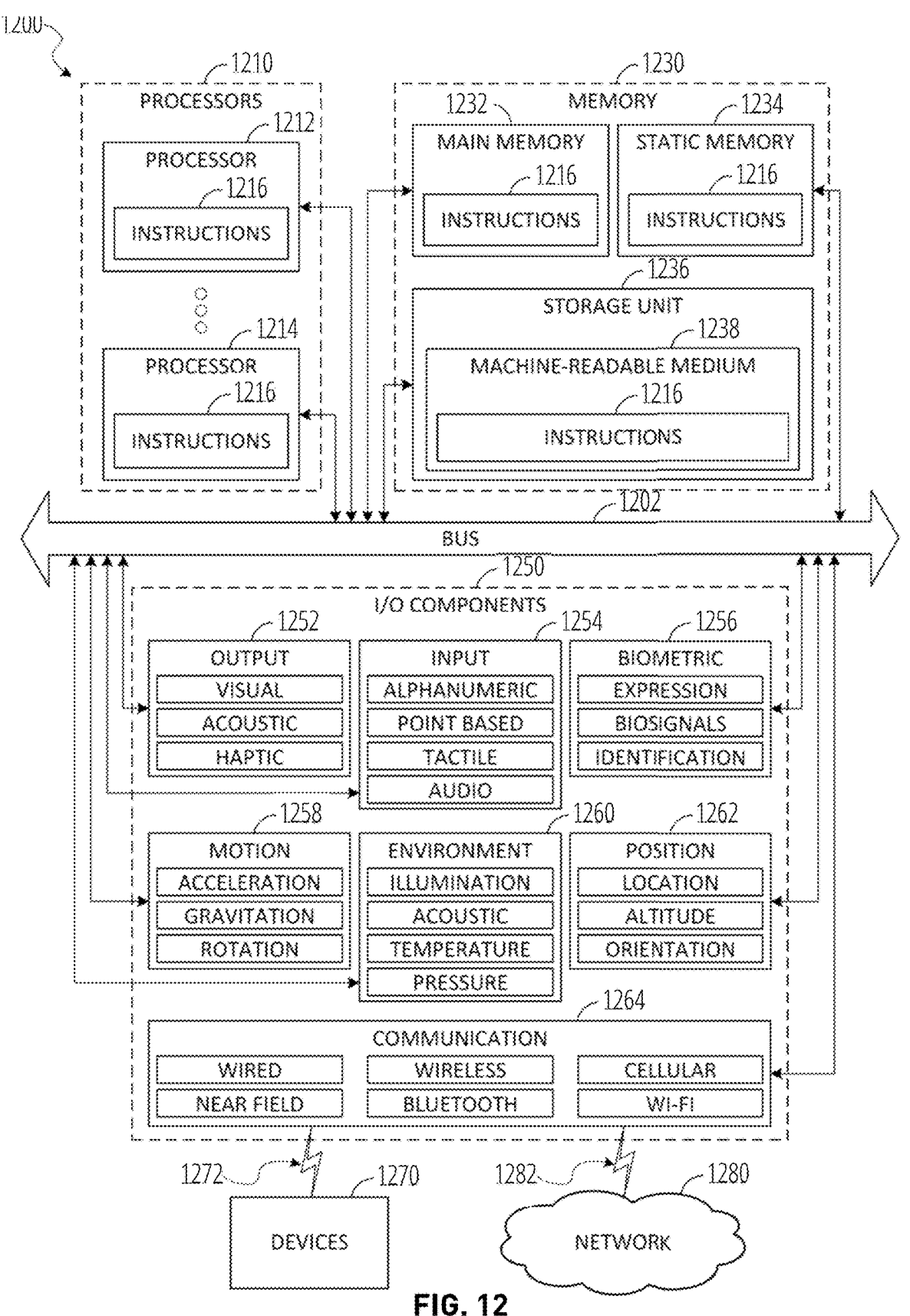
FIG. 12 is a block diagram illustrating components of a machine able to read instructions from a machine-readable medium and perform any one or more of the methodologies discussed herein, according to various embodiments of the present disclosure.

FIG. 12 illustrates a diagrammatic representation of a machine 1200 in the form of a computer system within which a set of instructions may be executed for causing the machine 1200 to perform any one or more of the methodologies discussed herein, according to an embodiment. The machine 1200 may refer to any of the nodes in the server system 108 (e.g., existing nodes S1-S3 and new nodes S4-S5). Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein may be executed. For example, the instructions 1216 may cause the machine 1200 to execute the method 1000 described above with respect to FIG. 10. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an embodiment, the processors 1210 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors that may comprise two or more independent processors (sometimes referred to as "cores") that may execute instructions contemporaneously. Although FIG. 12 shows multiple processors 1210, the machine 1200 may include a single processor with a single core, a single processor with multiple cores (e.g., a multi-core processor), multiple processors with a single core, multiple processors with multiples cores, or any combination thereof.

The memory 1230 may include a main memory 1232, a static memory 1234, and a storage unit 1236 including machine-readable medium 1238, each accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion, and the grouping is in no way limiting. In some examples, the I/O components 1250 may include output components 1252 and input components 1254. The output components 1252 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 1250 may include biometric components 1256, motion components 1258, environmental components 1260, or position components 1262, among a wide array of other components. The motion components 1258 may include acceleration sensor components (e.g., accelerometer), gravitation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1262 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some examples, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1200 including processors 1210), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 1200, but deployed across a number of machines 1200. In some example embodiments, the processors 1210 or processor-implemented modules are located in a single geographic location (e.g., within a home environment, an office environment, or a server farm). In other example embodiments, the processors or processor-implemented modules are distributed across a number of geographic locations.

The various memories (i.e., 1230, 1232, 1234, and/or the memory of the processor(s) 1210) and/or the storage unit 1236 may store one or more sets of instructions 1216 and data structures (e.g., software) embodying or utilized by any one or more of the methodologies or functions described herein. These instructions (e.g., the instructions 1216), when executed by the processor(s) 1210, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1216 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In some examples, one or more portions of the network 1280 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), World-wide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

The term "node" is a fundamental unit of data storage used in data structures. It holds data and links to other nodes, forming a structure that allows efficient data access, manipulation, and storage.

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

Example 1. A system comprising: one or more hardware processors; and at least one machine-storage medium storing instructions that, when executed by the one or more hardware processors, cause the one or more hardware processors to perform operations comprising: deploying a first cluster of nodes in at least one data center, the first cluster of nodes comprising: a leader node in communication with a client device; and at least one follower node in communication with the leader node; establishing one or more additional nodes; configuring the one or more additional nodes as a set of learner nodes associated with the first cluster of nodes; configuring a predetermined number of learner nodes from the set of learner nodes as a predetermined number of follower nodes in a second cluster of nodes; transitioning the leader node and the at least one follower node from the first cluster of nodes to the second cluster of nodes; and configuring at least one learner node from the set of learner nodes as a follower node in the second cluster of nodes.

Example 2. The system of example 1, wherein the at least one follower node is transitioned to the second cluster of nodes before the leader node.

Example 3. The system of any one of examples 1-2, wherein the leader node and the at least one follower node are transitioned one at a time.

Example 4. The system of any one of examples 1-3, wherein the predetermined number is greater than a count of quorum in the second cluster of nodes.

Example 5. The system of any one of examples 1-4, wherein the predetermined number is less than a sum of a count of quorum in the second cluster of nodes and a count of quorum in the first cluster of nodes.

Example 6. The system of example 5, wherein the predetermined number equals the sum of the count of quorum in the second cluster of nodes and the count of quorum in the first cluster of nodes minus one.

Example 7. The system of any one of examples 1-6, wherein the set of learner nodes do not participate in a leader election until configured into one or more follower nodes in the second cluster of nodes.

Example 8. The system of any one of examples 1-7, wherein the operations further comprise: transmitting log entries from the leader node to the set of learner nodes to synchronize local log entries stored in the set of learner nodes with the log entries of the leader node; and in response to a detection that the local log entries in the set of learner nodes have been synchronized with the log entries of the leader node, configuring the predetermined number of learner nodes as the predetermined number of follower nodes in the second cluster of nodes.

Example 9. The system of any one of examples 1-8, wherein the at least one data center comprises at least two distributed data centers.

Example 10. The system of example 9, wherein the set of learner nodes are deployed in the at least two distributed data centers.

Example 11. The system of any one of examples 1-10, wherein the set of learner nodes are deployed in at least one additional data center.

Example 12. A method comprising: deploying a first cluster of nodes in at least one data center, the first cluster of nodes comprising: a leader node in communication with a client device; and at least one follower node in communication with the leader node; establishing one or more additional nodes; configuring the one or more additional nodes as a set of learner nodes associated with the first cluster of nodes; configuring a predetermined number of learner nodes from the set of learner nodes as a predetermined number of follower nodes in a second cluster of nodes; transitioning the leader node and the at least one follower node from the first cluster of nodes to the second cluster of nodes; and configuring at least one learner node from the set of learner nodes as a follower node in the second cluster of nodes.

Example 13. The method of example 12, wherein the at least one follower node is transitioned to the second cluster of nodes before the leader node.

Example 14. The method of any one of examples 12-13, wherein the leader node and the at least one follower node are transitioned one at a time.

Example 15. The method of any one of examples 12-14, wherein the predetermined number is greater than a count of quorum in the second cluster of nodes.

Example 16. The method of any one of examples 12-15, wherein the predetermined number is less than a sum of a count of quorum in the second cluster of nodes and a count of quorum in the first cluster of nodes.

Example 17. The method of example 16, wherein the predetermined number equals the sum of the count of quorum in the second cluster of nodes and the count of quorum in the first cluster of nodes minus one.

Example 18. The method of any one of examples 12-17, wherein the set of learner nodes do not participate in a leader election until configured into one or more follower nodes in the second cluster of nodes.

Example 19. The method of any one of examples 12-18, wherein the method further comprises: transmitting log entries from the leader node to the set of learner nodes to synchronize local log entries stored in the set of learner nodes with the log entries of the leader node; and in response to a detection that the local log entries in the set of learner nodes have been synchronized with the log entries of the leader node, configuring the predetermined number of learner nodes as the predetermined number of follower nodes in the second cluster of nodes.

Example 20. A machine-storage medium for storing instructions that, when executed by one or more hardware processors, cause the one or more hardware processors to perform operations comprising: deploying a first cluster of nodes in at least one data center, the first cluster of nodes comprising: a leader node in communication with a client device; and at least one follower node in communication with the leader node; establishing one or more additional nodes; configuring the one or more additional nodes as a set of learner nodes associated with the first cluster of nodes; configuring a predetermined number of learner nodes from the set of learner nodes as a predetermined number of follower nodes in a second cluster of nodes; transitioning the leader node and the at least one follower node from the first cluster of nodes to the second cluster of nodes; and configuring at least one learner node from the set of learner nodes as a follower node in the second cluster of nodes.

What is claimed is:

1. A system comprising:
one or more hardware processors; and
at least one machine-storage medium storing instructions that, when executed by the one or more hardware processors, cause the system to perform operations comprising:
deploying a first cluster of nodes in at least one data center, the first cluster of nodes comprising:
a leader node in communication with a client device; and
at least one follower node in communication with the leader node;
establishing one or more additional nodes;
configuring the one or more additional nodes as a set of learner nodes associated with the first cluster of nodes;
configuring a predetermined number of learner nodes from the set of learner nodes as a predetermined number of follower nodes in a second cluster of nodes;
transitioning the leader node and the at least one follower node from the first cluster of nodes to the second cluster of nodes; and
configuring at least one learner node from the set of learner nodes as a follower node in the second cluster of nodes.

2. The system of claim 1, wherein the at least one follower node is transitioned to the second cluster of nodes before the leader node.

3. The system of claim 1, wherein the leader node and the at least one follower node are transitioned one at a time.

4. The system of claim 1, wherein the predetermined number is greater than a count of quorum in the second cluster of nodes.

5. The system of claim 1, wherein the predetermined number is less than a sum of a count of quorum in the second cluster of nodes and a count of quorum in the first cluster of nodes.

6. The system of claim 5, wherein the predetermined number equals the sum of the count of quorum in the second cluster of nodes and the count of quorum in the first cluster of nodes minus one.

7. The system of claim 1, wherein the set of learner nodes do not participate in a leader election until configured into one or more follower nodes in the second cluster of nodes.

8. The system of claim 1, wherein the operations further comprise:
transmitting log entries from the leader node to the set of learner nodes to synchronize local log entries stored in the set of learner nodes with the log entries of the leader node; and
in response to detecting that the local log entries in the set of learner nodes have been synchronized with the log entries of the leader node, configuring the predetermined number of learner nodes as the predetermined number of follower nodes in the second cluster of nodes.

9. The system of claim 1, wherein the at least one data center comprises at least two distributed data centers.

10. The system of claim 9, wherein the set of learner nodes are deployed across the at least two distributed data centers.

11. The system of claim 1, wherein the set of learner nodes are deployed in at least one additional data center.

12. A method comprising:

deploying a first cluster of nodes in at least one data center, the first cluster of nodes comprising:

a leader node in communication with a client device; and at least one follower node in communication with the leader node;

establishing one or more additional nodes;

configuring the one or more additional nodes as a set of learner nodes associated with the first cluster of nodes;

configuring a predetermined number of learner nodes from the set of learner nodes as a predetermined number of follower nodes in a second cluster of nodes;

transitioning the leader node and the at least one follower node from the first cluster of nodes to the second cluster of nodes; and configuring at least one learner node from the set of learner nodes as a follower node in the second cluster of nodes.

13. The method of claim 12, wherein the at least one follower node is transitioned to the second cluster of nodes before the leader node.

14. The method of claim 12, wherein the leader node and the at least one follower node are transitioned one at a time.

15. The method of claim 12, wherein the predetermined number is greater than a count of quorum in the second cluster of nodes.

16. The method of claim 12, wherein the predetermined number is less than a sum of a count of quorum in the second cluster of nodes and a count of quorum in the first cluster of nodes.

17. The method of claim 16, wherein the predetermined number equals the sum of the count of quorum in the second cluster of nodes and the count of quorum in the first cluster of nodes minus one.

18. The method of claim 12, wherein the set of learner nodes do not participate in a leader election until configured into one or more follower nodes in the second cluster of nodes.

19. The method of claim 12, wherein the method further comprises:

transmitting log entries from the leader node to the set of learner nodes to synchronize local log entries stored in the set of learner nodes with the log entries of the leader node; and in response to a detection that the local log entries in the set of learner nodes have been synchronized with the log entries of the leader node, configuring the predetermined number of learner nodes as the predetermined number of follower nodes in the second cluster of nodes.

20. A machine-storage medium for storing instructions that, when executed by one or more hardware processors, cause the one or more hardware processors to perform operations comprising:

deploying a first cluster of nodes in at least one data center, the first cluster of nodes comprising:

a leader node in communication with a client device; and at least one follower node in communication with the leader node;

establishing one or more additional nodes;

configuring the one or more additional nodes as a set of learner nodes associated with the first cluster of nodes;

configuring a predetermined number of learner nodes from the set of learner nodes as a predetermined number of follower nodes in a second cluster of nodes;

transitioning the leader node and the at least one follower node from the first cluster of nodes to the second cluster of nodes; and configuring at least one learner node from the set of learner nodes as a follower node in the second cluster of nodes.

* * * * *